(No Model.)
R. E. ISMOND.
CAR TRUCK.
No. 262,426. Patented Aug. 8, 1882.
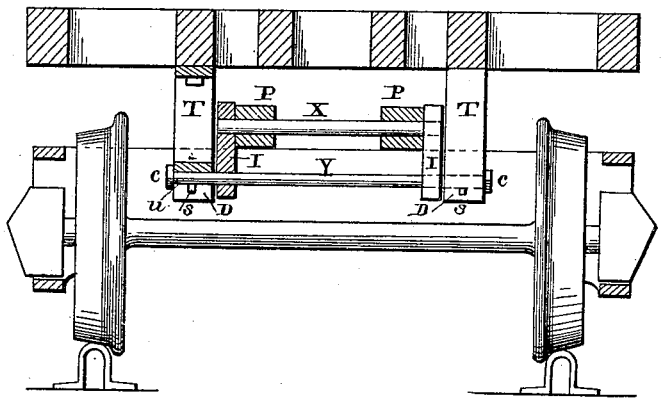
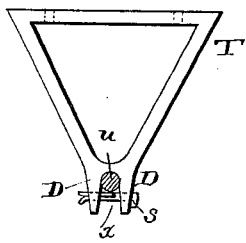 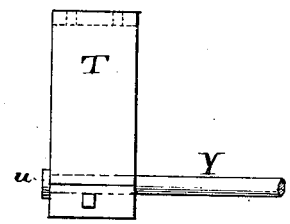 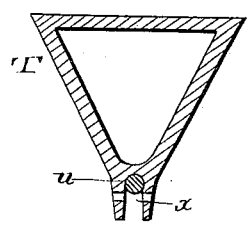
WITNESSES
Franck L. Ouraud
A. E. Hansmann
R. E. Ismond
INVENTOR
By Charles E. Foster
Attorney

UNITED STATES PATENT OFFICE.

ROBERT E. ISMOND, OF NEW YORK, N. Y.

CAR-TRUCK.

SPECIFICATION forming part of Letters Patent No. 262,426, dated August 8, 1882.

Application filed May 1, 1882. (No model.)

*To all whom it may concern:*

Be it known that I, ROBERT E. ISMOND, a citizen of the United States, and a resident of the city, county, and State of New York, have invented certain new and useful Improvements in Suspension Car-Trucks, of which the following is a specification.

My invention consists of improvements in what are known as "suspension-trucks," where the body of the car is supported by swinging links pendent from bearings on the truck; and my invention consists in constructing the bearing-brackets attached to the car, and in suspending the bearings, as hereinafter fully described, so as to permit a ready detachment of the truck from the body without the necessity of unbolting any of the parts.

In the drawings, Figure 1 is an elevation in part section of sufficient of a suspension-truck and car-body to illustrate my improvement. Fig. 2 is a side view of the bearing-bracket, showing the end of the bearing-rod in section. Fig. 3 is a side view of the bracket, and Fig. 4 is a sectional view thereof.

In suspension-trucks as heretofore made it is common to connect bearings or brackets upon the under side of the body permanently to a rod carried by links suspended from the truck, so that the truck cannot be disconnected from the car without first removing the suspension-rod or unbolting the bearings. This permanent connection is attended with many disadvantages, which I overcome by my improved construction.

To reduce the labor necessary to detach the truck, I form in each bearing-bracket T, between two fingers, D D, a notch or socket, $x$, which receives the end bearing, $u$, of a bearing-rod, Y, carried by links I, suspended to a rod, X, turning in bearings P on the truck, so that the platform can be disconnected from the truck by merely raising it until the brackets are above and free from the truck, without the necessity of detaching or loosening any of the parts of the structure. To preserve the proper position of the brackets on the rod Y, I provide the latter with heads or shoulders $c$.

A key, $s$, may be run through the fingers D D, Fig. 2, or a lock-hinge may be used to temporarily retain the rod in its sockets, without interfering with the ready and instant removal of the body from the truck. The bearings $u$ may be wrist-pins upon the links.

Without limiting myself to the precise construction and arrangement shown, I claim—

1. The combination, with the truck provided with links carrying bearings $u$, of brackets connected to the car-platform and provided with open sockets to receive the bearings $u$, substantially as set forth.

2. The combination of the links having bearings $u$ and suspended to the truck, and brackets connected to the body and provided with sockets and keys or movable locking devices, for the purpose set forth.

In testimony whereof I have signed my name to this specification in the presence of two subscribing witnesses.

ROBT. E. ISMOND.

Witnesses:
C. W. ROGERS,
ED. P. HOWELL.